US008832378B2

(12) United States Patent
Porat et al.

(10) Patent No.: US 8,832,378 B2
(45) Date of Patent: Sep. 9, 2014

(54) SYSTEM AND A METHOD FOR SELECTING A CACHE WAY

(75) Inventors: Rotem Porat, Kfar Saba (IL); Moshe Anschel, Kfar Saba (IL); Alon Eldar, Ra'anana (IL); Amit Gur, Eyn Vered (IL); Shai Koren, Ra'anana (IL); Itay Peled, Beer-Shev A (IL)

(73) Assignee: Freescale Semiconductor, Inc., Austin, TX (US)

( * ) Notice: Subject to any disclaimer, the term of this patent is extended or adjusted under 35 U.S.C. 154(b) by 258 days.

(21) Appl. No.: 12/934,275

(22) PCT Filed: Apr. 11, 2008

(86) PCT No.: PCT/IB2008/051376
§ 371 (c)(1),
(2), (4) Date: Sep. 24, 2010

(87) PCT Pub. No.: WO2009/125249
PCT Pub. Date: Oct. 15, 2009

(65) Prior Publication Data
US 2011/0022800 A1    Jan. 27, 2011

(51) Int. Cl.
*G06F 12/00*    (2006.01)
*G06F 12/12*    (2006.01)
*G06F 12/08*    (2006.01)

(52) U.S. Cl.
CPC .......... *G06F 12/0864* (2013.01); *G06F 12/126* (2013.01)
USPC ..... 711/128; 711/113; 711/144; 711/E12.018

(58) Field of Classification Search
CPC ..................... G06F 12/0864; G06F 12/0808
See application file for complete search history.

(56) References Cited

U.S. PATENT DOCUMENTS

| 6,044,478 A | 3/2000 | Green |
| 6,823,426 B2 | 11/2004 | Goldschmidt et al. |
| 2003/0120870 A1 | 6/2003 | Goldschmidt et al. |
| 2008/0022046 A1* | 1/2008 | Miller ........................... 711/128 |
| 2008/0147989 A1* | 6/2008 | Williams, III ................ 711/145 |

OTHER PUBLICATIONS

International Search Report and Written Opinion correlating to PCT/IB2008/051376 dated Oct. 24, 2008.

* cited by examiner

*Primary Examiner* — Reginald Bragdon
*Assistant Examiner* — Thanh D Vo

(57) ABSTRACT

A method for selecting a cache way, the method includes: selecting an initially selected cache way out of multiple cache ways of a cache module for receiving a data unit; the method being characterized by including: searching, if the initially selected cache way is locked, for an unlocked cache way, out of at least one group of cache ways that are located at predefined offsets from the first cache way.

17 Claims, 5 Drawing Sheets

200

300

SYSTEM AND A METHOD FOR SELECTING A CACHE WAY

FIELD OF THE INVENTION

The present invention relates to a system and a method for selecting a cache way.

BACKGROUND OF THE INVENTION

Cache modules are high-speed memories that facilitate fast retrieval of information including data and instructions. Typically, cache modules are relatively expensive and are characterized by a small size, especially in comparison to higher-level memory modules.

The performance of modern processor-based systems usually depends upon the cache module performances and especially upon the speed of a provision of an information unit that caused a cache miss. A cache hit occurs when an information unit that is requested is present in a cache module memory. A cache miss occurs when the requested information unit is not present in the cache module and has to be fetched from another memory module. This other memory module is also referred to as a higher-level memory module.

After being fetched from the higher level memory module the fetched information unit is written to the cache module and replaces a previously stored information unit. An information unit replacement scheme is responsive to the association level of the cache module. In fully associative cache module a fetched information unit can be written to any entry of the cache module. In a k-way cache a fetched information unit can be written to one out of k entries of the cache.

Cache ways can be temporarily locked such as to prevent a fetched information unit to be written to them. The locking can facilitate sharing information between tasks, but this is not necessarily so.

Once a cache miss occurs the information unit should be retrieved from the higher level memory module and be stored in the cache module as soon as possible. Accordingly, the selection of the cache way that will store the information unit should be completed in a relative short time period, even at the presence of one or more locked cache ways.

SUMMARY OF THE PRESENT INVENTION

The present invention provides a method, a system and a computer program product, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF PREFERRED EMBODIMENTS

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The examples described below, with reference to the drawings are, accordingly, to be regarded in an illustrative rather than in a restrictive sense.

Figure 1:
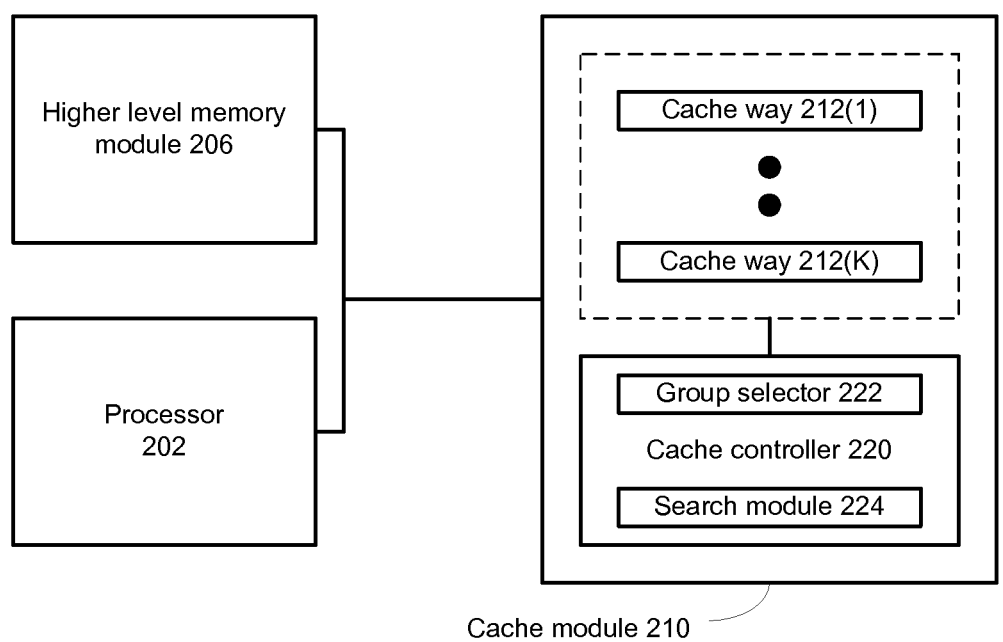
FIG. 1 schematically shows an example of an embodiment of a system.

FIG. 1 schematically shows an example of an embodiment of system 200 which includes processor 202, cache module 210 and higher level memory module 206. It will be apparent that system 200 may include more than a single processor, more than a single cache module, more than a single higher level memory module. Additionally or alternatively, system 200 can include a direct memory address controller, logic, one or more integrated circuits, as well as other circuits. The mentioned above components can be connected to each other in various manners and include more ports that illustrated in FIG. 1.

Cache module 210 may be implemented in any manner suitable for the specific implementation. Cache module 210 can for example be a level one cache module while higher level memory module 206 can be a level two cache module, but this is not necessarily so. Cache module 210 can store data, instructions or a combination thereof. Accordingly, system 200 can include a data cache module as well as an instruction cache module.

In operation, processor 202 can request memory modules from cache module 210. If a cache hit occurs cache module 210 provides the requested information unit to processor 202.

If a cache miss occurs cache module 210 fetches the requested information unit from higher level memory module 206, stores the fetched information unit in a selected cache way and provides the requested information unit to processor 202. It is noted that information units can be written to the cache module 210 and/or to the higher level memory module 206 by applying write back or write through policies.

It is noted that the selection of the selected cache way allows writing new information to one or more cache lines of the selected cache way. These one or more cache lines are referred to as evicted cache lines. The "older" information stored in these evicted cache lines is thrown out of the cache and written to higher level memory.

Cache module 210 includes multiple cache ways 212(1)-212(K). Cache module 210 also includes cache controller 220. Alternatively, cache controller 220 can be connected to cache module 210 without being included in cache module 210.

Cache controller 220 is adapted to: (i) select an initially selected cache way out of cache ways 212(1)-212(K) for receiving an information unit; (ii) determine if the initially selected cache way is locked; (iii) control the writing of the information unit to the initially selected cache way if it is not locked; (iv) search, if the initially selected cache way is locked, for an unlocked cache way, out of at least one group of cache ways that are located at predefined offsets from the first cache way; (v) write the information unit to the unlocked cache way.

At least one group of predefined offsets may be generated or received in advance—before starting the search. For example, the at least one group of offsets can be received or defined during a cache module initialization stage.

Typically, each cache way is identified by an identifier. For example, in an eight-way cache module the cache way identifiers can range between zero to seven.

The number of predefined offsets may equal the number of the cache ways, thus a full coverage of the whole cache is provided. The values of the predefined offsets (if they are defined between the initially selected cache way and other candidates) are within a range that spans from one to the number of cache ways. The search process includes calculating cache ways identifiers by adding the predefined offsets to an initially selected cache way identifier, and performing a modulo operation.

If the initially selected cache way is locked then the next cache way to be evaluated can be calculated by adding a predefined offset to the initially selected cache way. If the next cache way is also locked then another cache way is selected—by adding a predefined offset to that next cache way or by adding a predefined offset to the initially selected cache way.

It is noted that multiple cache ways can be selected in parallel so that if one cache way is locked another cache way can be selected. For example, if there are N cache ways then (N−1) cache ways can be selected in parallel or a sub set of fewer than (N−1) cache ways can be selected each iteration.

Metadata can indicate whether a cache way is locked or not. This metadata can be arranged in various manners. For example, a bitmap can indicate which cache way is locked. It is noted that the locking can be applied in various manners.

Cache controller 220 can select the initially selected cache way in a random manner, in a pseudo-random manner, according to a predefined scheme or a combination thereof. Once the initially selected cache way is locked cache controller 220 searches for another cache way that is unlocked by utilizing one or more predefined offsets.

The search process can involve checking whether one or more searched cache way is unlocked. Predefined offsets can define the offset between each searched cache way and the initially selected cache way but can also be defined between one searched cache way to the other.

A group of predefined offsets includes one or more predefined offsets. If the offsets are defined between searched cache ways then a group that includes multiple predefined offsets can include offsets that are equal to each other, offsets that differ from each other, or a combination thereof.

For example, cache controller 220 is adapted to: (i) utilize a first group of predefined offsets that includes positive offsets so as to define a first group of cache ways; and (ii) utilize a second group of predefined offsets that includes negative offsets so as to define a second group of cache ways. The first and second group of offsets can be utilized in parallel to each other or in a serial manner. A group of predefined offsets can be utilized by repetitively searching for a cache way that is located at a predefined offset (of the group of predefined offsets) from the initially selected cache way.

Cache controller 220 can stop the search once an unlocked cache way is found. Thus, it can utilize only a portion of the one or more groups of predefined offsets during the search. Cache controller 220 can check one cache way after the other and once an unlocked cache way is found—cache controller 220 can stop the search process.

Cache controller 220 can utilize another group of predefined offsets that includes at least one positive offset and at least one negative offset so as to define a third group of cache ways.

Cache controller 220 can include a group selector 222 that selects a group of predefined offsets out of multiple groups of predefined offsets; and search module 224 that searches for the unlocked cache way by utilizing the selected group of predefined offsets.

The selection between groups of predefined offsets can be made in a random manner, in a pseudo random manner, according to a predefined pattern and the like.

Alternatively, cache controller 220 can (i) search for multiple unlocked cache ways by utilizing multiple selected groups of predefined offsets; and (ii) select a selected unlocked cache way out of the multiple unlocked cache ways.

Cache controller 220 can apply a searching scheme that is characterized by a substantial uniform distribution among unlocked cache ways. This substantially uniform distribution can increase the hit rate of cache module 210, as information units are stored for longer time periods in the cache before being replaced by newer information units. This longer duration increases the chances of a cache hit.

Cache controller 220 can be adapted to utilize multiple groups of predefined offsets that are defined so as to increase a uniformity of distribution among unlocked cache ways. These groups can be defined based upon previous iterations of initial selection of cache ways and search of unlocked cache ways.

One or more groups of predefined offsets can be found by simulation. A simulator (not shown) can try to evaluate the success of various groups of predefined offsets under different cache ways scenarios. The success can indicate whether unlocked cache ways are selected in a substantially uniform manner. Multiple groups of predefined offsets can be evaluated under different cache ways scenarios whereas a cache way scenario indicates which cache ways are locked.

Cache controller 220 can: (i) select a cache way for each group of predefined offsets. This cache way is referred to as a group cache way; and (ii) select a selected cache way out of the group cache ways.

The selection of a group cache way can include, for each group of predefined offsets, the following: (i.1) add each offset of the group of predefined offsets to the initially selected way identifier (in parallel) and apply a modulo operation to produce multiple cache ways to be checked (determine if these cache ways are locked). (i.2) check, in parallel, whether these cache ways are locked or unlocked, and (i.3) select, based upon priority, among the open cache ways, the group cache way. It is noted that the selection can involve selecting the first unlocked way after the initially selected cache way.

Figure 2:
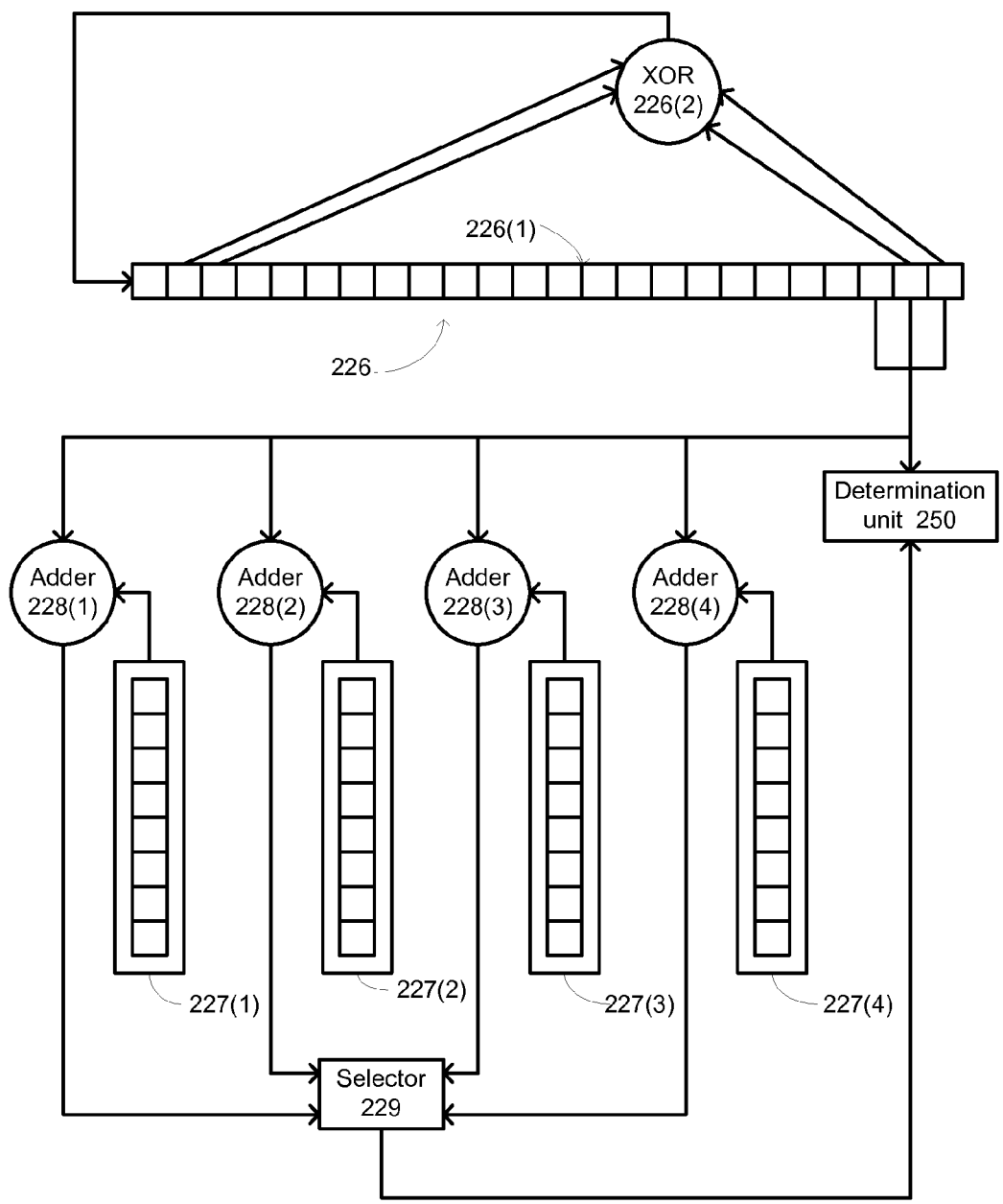
FIG. 2 schematically shows an example of an embodiment of a portion of a cache controller.

FIG. 2 schematically shows an example of an embodiment of cache controller 220.

Cache controller 220 includes initial selection logic 226, predefined offset group storage units 227(1)-227(4), adders 228(1)-228(4), selector 229 and determination unit 250.

Initial selection logic 226 includes shift register 226(1) and logic XOR gate 226(2). Multiple cells of shift register 226(1) are connected to inputs of XOR gate 226(2) and the output of XOR gate 226(2) is connected to the input of shift register 226(1). Assuming that cache module 210 include eight cache ways the last three cells of shift register 226(1) provide the index of the initially selected cache way. This index is provided to determination unit 250 that in turn determines whether the initially selected cache way is locked or not and whether to search for another cache way.

The three last cells of shift register 226(1) are connected (in parallel) to four adders 228(1)-228(4). Each adder receives a predefined offset from a corresponding offset group storage unit. During a first iteration each adder receives a first predefined offset, during a second iteration each adder receives a second predefined offset, and so on. It is noted that adders can receive multiple offsets and provide (in parallel) multiple cache way identifiers.

The output of each adder is connected to selector 229 that determines which cache way identifier will be sent to determination unit 250.

For example, first predefined offset group storage unit 227(1) can store the following predefined group of offsets: 7, 6, 5, 4, 3, 2 and 1; second predefined offset group storage unit 227(1) can store the following predefined group of offsets: −7, −6, −5, −4, −3, −2 and −1; third predefined offset group storage unit 227(3) can store the following predefined group of offsets: 7, 5, 3, 1, 6, 4 and 2; and fourth predefined offset group storage unit 227(4) can store the following predefined group of offsets: −7, −5, −3, −1, −6, −4 and −2. These predefined offsets are defined from the initially selected cache way. It is noted that each of these offset group storage units can store another group of predefined offsets.

It is noted that selector 229 can select to send to determination unit 250 a sum (also referred to as cache way identifier) that is calculated by first adder, then (at another iteration) send a sum that is calculated by another adder, and the like.

Selector 225 can select the adder in a random manner, in a pseudo-random manner, according to a predefined scheme or a combination thereof.

Cache controller 220 can be implemented in software, firmware, hardware or a combination thereof.

Figure 3:
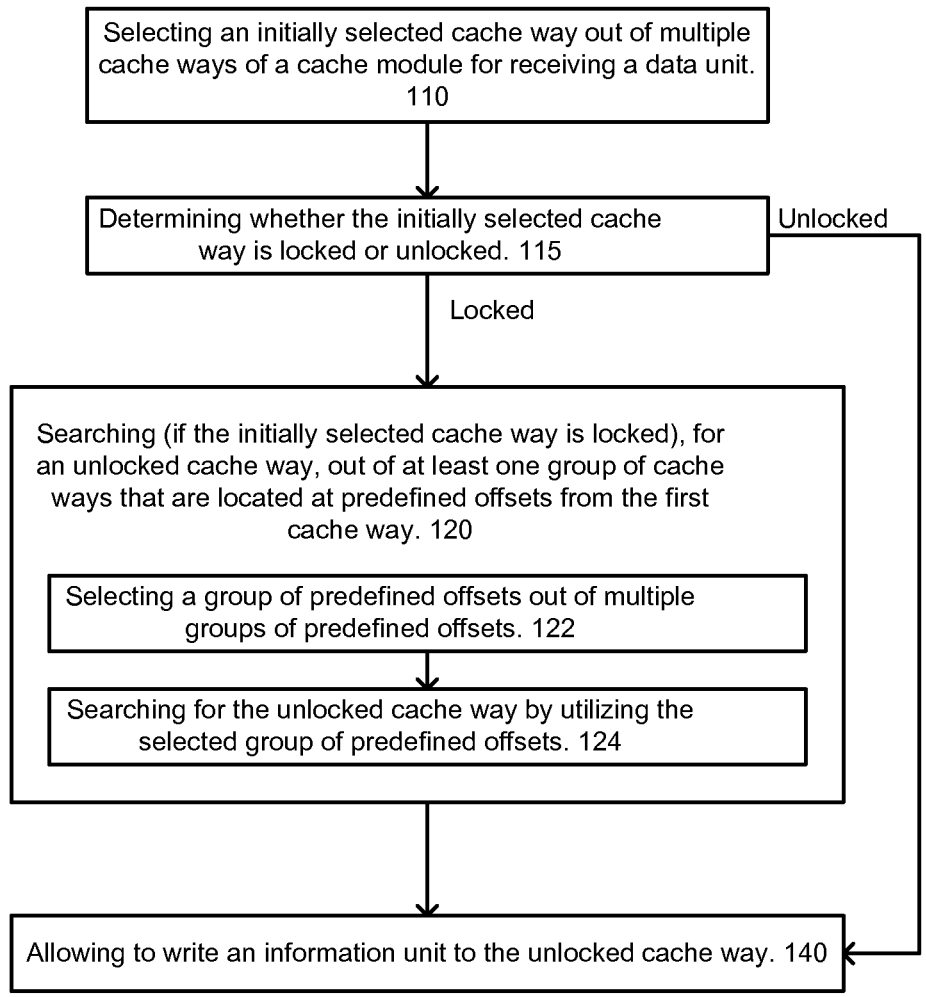
FIG. 3 schematically shows an example of an embodiment of a method.

FIG. 3 schematically shows an example of an embodiment of method 100 for selecting a cache way.

Method 100 starts by stage 110 of selecting an initially selected cache way out of multiple cache ways of a cache module for receiving a data unit.

Stage 110 is followed by stage 115 of determining whether the initially selected cache way is locked or unlocked. If the initially selected cache way is unlocked stage 115 is followed by stage 140 of allowing to write an information unit to the unlocked cache way.

If the initially selected cache way is locked stage 115 is followed by stage 120 of searching (if the initially selected cache way is locked), for an unlocked cache way, out of at least one group of cache ways that are located at predefined offsets from the initially selected cache way.

Stage 120 can include: (i) selecting a cache way for each group of predefined offsets. This cache way is referred to as a group cache way; and (ii) selecting a selected cache way out of the group cache ways.

The selecting of a group cache way can include, for each group of predefined offsets, the following: (i.1) adding each offset of the group of predefined offsets to the initially selected way identifier (in parallel) and apply a modulo operation to produce multiple cache ways to be checked (determine if these cache ways are locked). (i.2) checking, in parallel, whether these cache ways are locked or unlocked, and (i.3) selecting, based upon priority, among the open cache ways, the group cache way. It is noted that the selection can involve selecting the first unlocked way after the initially selected cache way.

Once an unlocked cache ways is found stage 120 is followed by stage 140.

Method 100 can be applied by system 200 of FIG. 1 and by cache controller 220 of FIG. 2.

Stage 120 can include, for example, at least one of the following operations or a combination thereof: (i) utilizing a first group of predefined offsets that comprises positive offsets so as to define a first group of cache ways; (ii) utilizing a second group of predefined offsets that comprises negative offsets so as to define a second group of cache ways; (iii) utilizing a third group of predefined offsets that comprises at least one positive offset and at least one negative offset so as to define a third group of cache ways.

FIG. 3 illustrates stage 120 as including stage 122 of selecting a group of predefined offsets out of multiple groups of predefined offsets; and stage 124 of searching for the unlocked cache way by utilizing the selected group of predefined offsets.

Figure 4:
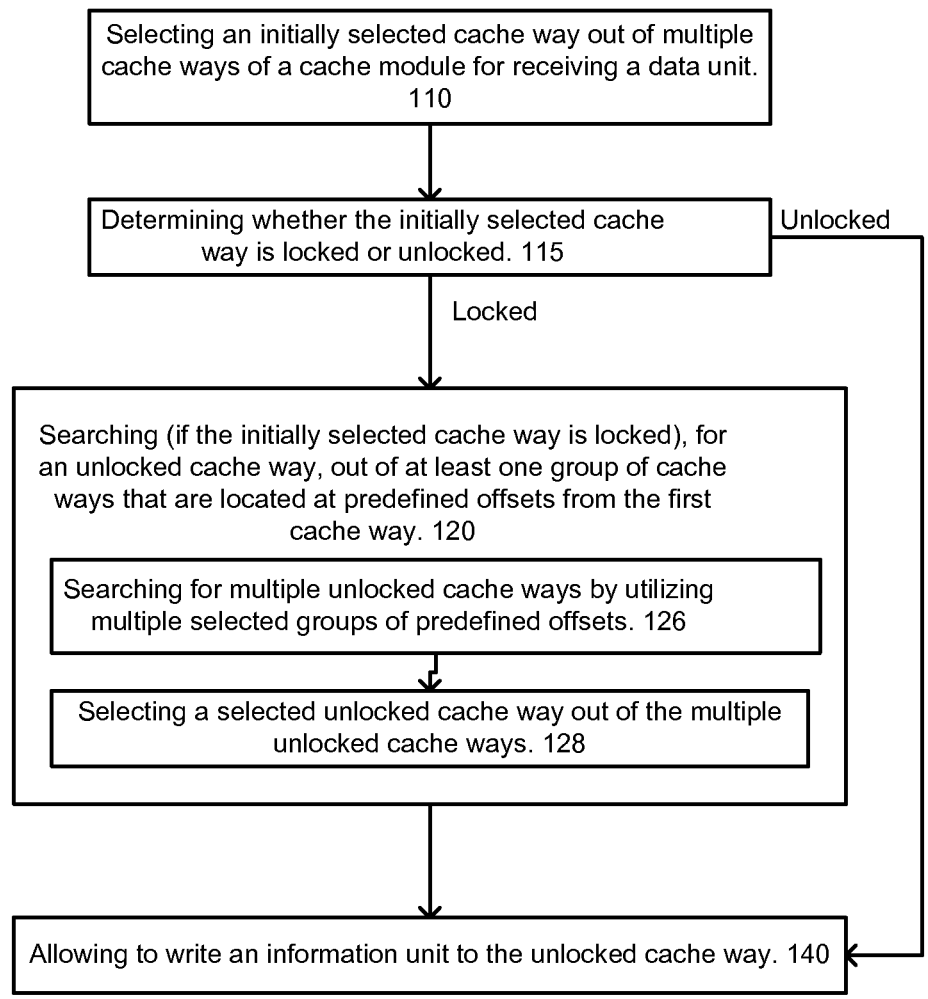
FIG. 4 schematically shows an example of an embodiment of a method.

FIG. 4 illustrates stage 120 as including stage 126 of searching for multiple unlocked cache ways by utilizing multiple selected groups of predefined offsets; and stage 128 of selecting a selected unlocked cache way out of the multiple unlocked cache ways.

Stage 120 can include applying a searching scheme that is characterized by a substantial uniform distribution among unlocked cache ways.

Stage 120 can include utilizing multiple groups of predefined offsets that are defined so as to increase a uniformity of distribution among unlocked cache ways.

Figure 5:
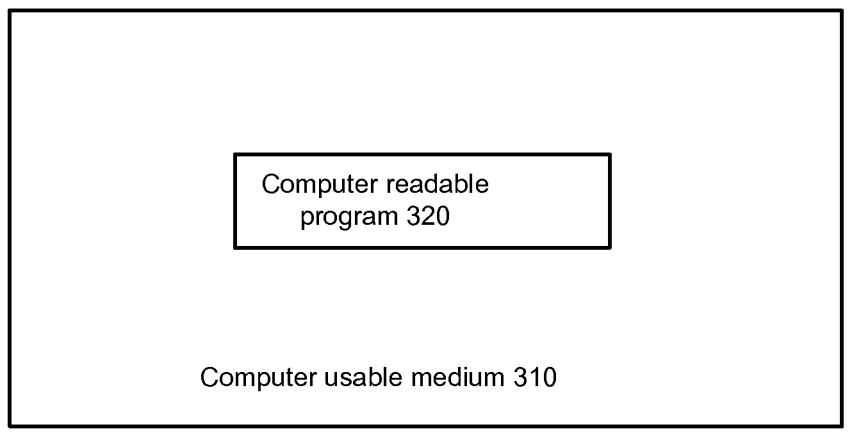
FIG. 5 schematically shows an example of an embodiment of a computer program product.

FIG. 5 schematically shows an example of an embodiment of computer program product 300.

Computer program product 300 includes a computer usable medium 310 that stores computer readable program 320. The computer readable medium may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

The computer readable program 320 when executed on a computer causes the computer to execute method 100 of FIG. 3, and additionally or alternatively execute method 100 of FIG. 4.

The computer readable program 320 when executed on a computer causes the computer to (i) select an initially selected cache way out of multiple cache ways of a cache module for receiving a data unit; and (ii) search, if the initially selected cache way is locked, for an unlocked cache way, out of at least one group of cache ways that are located at predefined offsets from the first cache way.

The computer readable program may for example be a list of instructions such as a particular application program and/ or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

We claim:

1. A method for selecting a cache way, the method comprising:
   determining an initial cache identifier;
   selecting an initial cache way, out of multiple cache ways of a cache
   module, for receiving a data unit based upon the initial cache identifier;
   adding, in response to the initial cache way being locked, an offset to the initial cache identifier to determine an updated cache identifier, wherein the updated cache identifier is less than the initial cache way identifier in response to the offset being a negative offset;
   selecting a next cache way based on the updated identifier;
   determining, if the next cache way is locked; and
   selecting the offset from a first group of predefined offsets that comprises positive offsets so as to define a first group of cache ways, and a second group of predefined offsets that comprises negative offsets so as to define a second group of cache ways.

2. The method according to claim 1 wherein selecting the offset further includes utilizing a third group of predefined offsets that comprises at least one positive offset and at least one negative offset so as to define a third group of cache ways.

3. The method according to claim 1 further comprising:
   selecting the offset from a group of predefined offsets out of multiple groups of predefined offsets.

4. The method according to claim 1 further comprising:
   writing information to the next cache way in response to the next cache way being unlocked.

5. The method according to claim 1 further comprising:
   applying a searching scheme with a uniform distribution among unlocked cache ways.

6. The method according to claim 1 further comprising:
   utilizing multiple groups of predefined offsets that are defined so as to increase a uniformity of distribution among unlocked cache ways.

7. A system comprising:
   multiple cache ways;
   a cache controller that is adapted to determine an initial cache identifier, to select an initial cache way out of the multiple cache ways for receiving a data unit based upon the initial cache way identifier, to add, in response to the initial cache way being locked, an offset to the initial cache identifier, wherein the updated cache identifier is less than the initial cache way identifier in response to the offset being a negative offset, to select a next cache way out of the multiple cache ways based on the updated identifier, and to determine if the next cache way is locked; and
   the cache controller to utilize a first group of predefined offsets that comprises positive offsets so as to define a first group of cache ways, and to utilize a second group of predefined offsets that comprises negative offsets so as to define a second group of cache ways.

8. The system according to claim 7 wherein the cache controller is adapted to utilize a third group of predefined offsets that comprises at least one positive offset and at least one negative offset so as to define a third group of cache ways.

9. The system according to claim 7 wherein the cache controller is adapted to select the offset from a group of predefined offsets out of multiple groups of predefined offsets.

10. The system according to claim 7 wherein the cache controller is adapted to: write information to the next cache way in response to the next cache way being unlocked.

11. The system according to claim 7 wherein the cache controller is adapted to apply a searching scheme with a uniform distribution among unlocked cache ways.

12. The system according to claim 7 wherein the cache controller is adapted to utilize multiple groups of predefined offsets that are defined so as to increase a uniformity of distribution among unlocked cache ways.

13. A non-transitory computer program product comprising a computer usable medium including a computer readable program, wherein the computer readable program when executed on a computer causes the computer to:
   determine an initial cache identifier;
   select an initial cache way, out of multiple cache ways of a cache module, for receiving a data unit based upon the initial cache identifier;
   add, in response to the initial cache way being locked, an offset to the initial cache identifier to determine an updated cache identifier, wherein the updated cache identifier is less than the initial cache way identifier in response to the offset being a negative offset;
   select a next cache way based on the updated identifier;
   determine if the next cache way is locked; and
   to utilize a first group of predefined offsets that comprises positive offsets so as to define a first group of cache ways; and utilize a second group of predefined offsets that comprises negative offsets so as to define a second group of cache ways.

14. The computer program product according to claim 13, wherein the computer readable program when executed on a computer causes the computer to select the offset from a group of predefined offsets out of multiple groups of predefined offsets.

15. The computer program product according to claim 13, wherein the computer readable program when executed on a computer causes the computer to:
   write information to the next cache way in response to the next cache way being unlocked.

16. The computer program product according to claim 13, wherein the computer readable program when executed on a computer causes the computer to apply a searching scheme with a uniform distribution among unlocked cache ways.

17. The computer program product according to claim 13, wherein the computer readable program when executed on a computer causes the computer to utilize multiple groups of predefined offsets that are defined so as to increase a uniformity of distribution among unlocked cache ways.

* * * * *